(12) United States Patent
Glynn

(10) Patent No.: US 8,341,961 B2
(45) Date of Patent: Jan. 1, 2013

(54) SOLAR DESALINATION SYSTEM

(75) Inventor: Kenneth P. Glynn, Flemington, NJ (US)

(73) Assignee: Kenergy Scientific, Inc., Flemington, NJ (US)

( * ) Notice: Subject to any disclaimer, the term of this patent is extended or adjusted under 35 U.S.C. 154(b) by 862 days.

(21) Appl. No.: 12/387,430

(22) Filed: May 1, 2009

(65) Prior Publication Data
US 2010/0275599 A1 Nov. 4, 2010

(51) Int. Cl.
*F03G 6/00* (2006.01)

(52) U.S. Cl. .................. 60/641.9; 60/641.11; 60/641.15

(58) Field of Classification Search ..... 60/641.8–641.15
See application file for complete search history.

(56) References Cited

U.S. PATENT DOCUMENTS

| | | | |
|---|---|---|---|
| 2,636,129 A | 4/1953 | Agnew | |
| 2,902,028 A | 9/1959 | Manly | |
| 3,342,697 A | 9/1967 | Hammond | |
| 3,451,220 A | 6/1969 | Buscemi | |
| 4,110,172 A | 8/1978 | Spears, Jr. | |
| 4,253,307 A * | 3/1981 | Smith | 60/641.9 |
| 4,280,328 A * | 7/1981 | Falconer | 60/641.12 |
| 4,302,297 A * | 11/1981 | Humiston | 202/185.1 |
| 4,323,052 A | 4/1982 | Stark | |
| 5,228,293 A * | 7/1993 | Vitale | 60/641.14 |
| 5,405,503 A * | 4/1995 | Simpson et al. | 203/10 |
| 5,727,379 A | 3/1998 | Cohn | |
| 2002/0092761 A1 | 7/2002 | Nagler | |

* cited by examiner

*Primary Examiner* — Hoang Nguyen
(74) *Attorney, Agent, or Firm* — Kenneth P. Glynn

(57) ABSTRACT

A solar desalination system for creation of desalinated water from seawater that produces electricity includes: a) a solar furnace unit including a vessel for receiving and evaporating seawater to create desalinated steam and a solar energy concentrator positioned adjacent the vessel to concentrate solar energy to the vessel; b) input for feeding seawater to the vessel; c) brine output for removal of brine water bottoms from the vessel; d) a riser pipe connected at its bottom to the vessel and extending upwardly from for transporting steam from the vessel to a higher elevation electric power-producing steam turbine generator; f) a drop pipe having a top and a bottom, and being connected at its tops to the steam turbine generator for removal of desalinated water from the steam turbine generator; g) a hydroturbine generator connected to the bottom of the drop pipe for production of electric power with desalinated water from the steam turbine generator; and, h) egress for removal of desalinated water from the hydroturbine generator for subsequent use.

20 Claims, 8 Drawing Sheets

SOLAR DESALINATION SYSTEM

BACKGROUND OF INVENTION a. Field of Invention

The invention relates generally to systems that provide for the conversion of salt water to desalination water and for the generation of electric power. More specifically, the present invention relates to systems that utilize solar energy to separate water from salt in saline water and use the resulting evaporative gases to effectively generate electric power.

b. Description of Related Art

The following patents are representative of the field pertaining to the present invention:

U.S. Pat. No. 5,727,379 to Cohn describes an electric power generation system that combines a gas turbine generator with a solar power plant and utilizes the gas turbine exhaust for steam superheating and feed water heating only. The solar heater is only utilized for boiling or evaporation of feed water into steam, the feed water having previously been heated by a downstream portion of the turbine exhaust. In order to balance the disparity between the specific heats of water and steam to thus optimize the system, the steam is superheated by and upstream portion of the turbine exhaust to first drive a high pressure steam turbine and then reheated by the same exhaust over the same temperature range to drive a low pressure steam turbine.

U.S. Pat. No. 5,405,503 to Simpson et al. describes a process and apparatus for desalinating seawater for brine and purifying water which contains minerals, salts, and other dissolved solids while simultaneously generating power. The salinous water is heated in a boiler to form steam and a concentrated brine. The concentrated brine is removed from the boiler, the steam produced in the boiler is washed with fresh water to remove trace salts and inorganic materials, and water bearing trace salts and inorganic materials are returned to the boiler. The washed steam is expanded across a turbine to generate electrical or mechanical power which is utilized as a product. The steam exhausted from the turbine is collected and condensed, and one portion of the condensed water is utilized as a fresh water product and another portion of the condensed water is used as the wash water to wash the steam produced in the boiler. Energy efficiency is improved by heat exchanging the hot concentrated brine against the salinous feed water or by flashing the brine to produce steam. Boiler scaling and corrosion may be controlled by feed water pretreatment. By utilizing distillation combined with power generation, demand for fresh water and power can be satisfied simultaneously.

U.S. Pat. No. 4,323,052 to Stark describes solar energy systems that provide for the distillation of liquids and/or the production of electricity using photovoltaic cells. Apparatus are disclosed which include an undulated system for conducting the liquid to be distilled, a linear lens disposed to concentrate solar energy on or below the undulated system, and a conduit transparent to visible light interposed between the undulated system and the linear lens. A cooling fluid is supplied to the conduit for assisting condensation of liquid evaporated from the undulated system on the lower wall of the conduit. The condensed liquid, the condensate and a concentrate of the liquid being distilled are collected. An array of photovoltaic cells may be disposed in the undulated system at a location of the concentration of solar energy to thereby provide for both distillation of the liquid and generation of electricity. Instead of an undulated system for conducting the liquid to be distilled, in one embodiment, a first transparent tube is disposed in a second transparent tube. The liquid to be distilled evaporates in the first transparent tube and is condensed on the upper wall thereof which has an outer surface in contact with the cooling fluid. If desired, photovoltaic cells may also be disposed in the first transparent tube. In another disclosed embodiment, a collector comprises tubes one disposed in the other with a fluid being circulated through each tube and insulation surrounding the lower portion of the tubes. Photovoltaic cells may be disposed in the innermost tube which is transparent.

U.S. Pat. No. 4,110,172 to Spears, Jr. describes a water-containing pond for collecting solar energy for utilization in a process for recovering potable water from non-potable water and/or for the generation of power. The solar pond in designed to increase the quantity and efficiency of water evaporation, from heated pond water, into a heated flowing air stream. Construction in such that there is afforded an increase in the absorptivity/emissivity (a/e) ratio with respect to the incidence of solar radiation.

U.S. Pat. No. 3,451,220 to Buscemi describes a combined closed-cycle condensable vapor motivated turbine power plant for generating electrical power and a liquid distillation plant for desalinating sea water, wherein the brine or feed liquid heater for the distillation plant is energized by exhaust steam from a back pressure turbine. The back pressure turbine is connected in tandem with one or more condensing turbines and the back pressure turbine and condensing turbines are fed motive vapor in parallel by a common conduit, thereby providing flexibility in control of the electrical and water production rates for varying demand. The control includes an arrangement for controlling the pressure of the heating vapor admitted to the brine heater regardless of load demand on the turbines, during periods in which water distillation requirements are constant, and in which the hot exhaust vapor supply from the back pressure turbine to the brine heater may be diverted during no load requirements on the distillation plant. The invention provides a combined plant of large output capability in which the hot vapor for motivating the turbines and the brine heater may be advantageously generated by a single nuclear reactor.

U.S. Pat. No. 3,342,697 to Hammond describes a device that constitutes a multilevel plural stage evaporator for the flash distillation of saline water, economically suited for large volume purification systems. Brine heated by a primary heat source is fed to a series of multilevel trays at one end of the evaporator shell and flows through successive stages defined by compartments formed in the common chamber of the evaporator shell at progressively lower pressures to flash and produce vapor. Condenser coils on either side of the tier of trays condense the vapor which is then collected in common troughs at the base of the shell. The feed is circulated through the condenser coils countercurrent to brine flow in the trays to serve the dual purpose of condensing the vapors and preheating the feed.

U.S. Pat. No. 2,902,028 to Manly describes a solar distillation unit comprising a recessed exteriorly insulated shell, transparent means sealing said recess to form a heating zone, a removable evaporator unit positioned in said heating zone, means positioned above the heating zone for focusing the sun's rays on the surface of said evaporator unit, feed water inlet lines in fluid communication with said heating zone located adjacent each end of said evaporator unit and including means for spraying feed water over the surface of said evaporator unit, means to tiltably mount said unit to respectively raise and lower the ends thereof, valve means operable to supply feed water to the uppermost of said feed lines when the unit is tilted at an angle, means for switching said valve to supply the water to the other of said feed lines when the angle of tilt is reversed, said evaporator unit comprising a plurality of open-ended tubes lying transverse the normal flow of water, adjacent tubes being in close proximity, means for maintaining said tubes in close proximity to form a rigid removable structure, said open-ended tubes being provided with apertures to permit a limited flow of the water cascading over said tubes into the interior thereof, a vapor outlet from the heating zone and means positioned between said heating zone and said vapor outlet for preventing flow of feed water from said heating zone into said vapor outlet.

U.S. Design Pat. No. 2,636,129 to Agnew describes a solar engine, a reservoir, a basin for receiving liquid from the reservoir, a differential pressure conduit extending from the reservoir to the basin for passing liquid into the latter, means in said conduit for removing free air in the liquid passing therethrough, a transparent dome for the basin and comprising a plurality of flat sheets for transmitting solar rays to evaporate the liquid in the basin, an upwardly directed duct extending from said dome to conduct the evaporated liquid to a level above and at a substantially lower atmospheric pressure than that of both the reservoir and the basin, a condenser at the upper end of the duct to condense said vapors, means for removing free air from the condenser, a storage reservoir elevated above the first-mentioned reservoir, and a differential pressure conduit leading from the condenser to the storage reservoir.

United States Design Patent No. 2002/0092761 A1 to Nagler describes an apparatus for the desalination or purification of water comprising a non-solid vessel having a bottom defining an opening, the vessel capable of being partially submerged below the surface of a body of water, a pan located within the vessel, the pan being flexibly connected to the inner wall of the vessel and being located beneath the surface of the water, a lens fixably connected to the top of the vessel, wherein the lens is focused beneath the surface of the water and above the surface of the pan means for varying the orientation of the vessel in accordance with the location of the sun, and means for condensing steam generated in the non-solid vessel, whereby steam generated in the non-solid vessel is condensed outside of the non-solid vessel. A method for the desalination or purification of water comprises the steps of containing a body of water within a vessel, the vessel having a lens fixably attached at the top and bottom defining an opening, located a pan just below the surface of the water, focusing the lens just beneath the surface of the water and just above the bottom surface of the pan, condensing water vapor, re-filling the vessel with water as the water is converted to steam, and periodically re-orienting the vessel in a manner that tracks movement of the sun.

Notwithstanding the prior art, the present invention is neither taught nor rendered obvious thereby.

SUMMARY OF INVENTION

The present invention is a solar desalination system for creation of desalinated water from seawater that also produces electricity. The present invention system includes: a) a solar furnace unit, including a vessel for receiving and evaporating seawater to create desalinated steam, and a solar energy concentrator positioned adjacent the vessel to concentrate solar energy to the vessel; b) input means for feeding seawater to the vessel; c) brine output means for removal of brine water bottoms from the vessel; d) a riser pipe having a top and a bottom and being connected at its bottom and to extending upwardly from the vessel for transporting steam from the vessel the riser pipe top positioned at a predetermined vertical height from the vessel; e) an electric power-producing steam turbine generator positioned at a predetermined vertical height from the vessel, and connected to the top of the riser pipe for production of electric power with steam from the container; f) a drop pipe having a top and a bottom, and being connected at its tops to the steam turbine generator for removal of desalinated water from the steam turbine generator; g) an electric power-producing hydroturbine generator connected to the bottom of the drop pipe for production of electric power with desalinated water from the steam turbine generator; and, h) egress means for removal of desalinated water from the hydroturbine generator for subsequent use.

In some preferred embodiments of the present invention solar desalination system, the riser pipe top and the steam turbine generator are at least 30 meters higher than the vessel.

In some preferred embodiments of the present invention solar desalination system, the solar energy concentrator is selected from the group consisting of a linear parabolic solar concentrator, a parabloid solar concentrator and plural mirror solar concentrator.

In some preferred embodiments of the present invention solar desalination system, the solar energy concentrator is moveably mounted, and includes solar tracking means adapted to move the solar energy concentrator to follow the sun.

In some preferred embodiments of the present invention solar desalination system, the system further includes: i) auxiliary heating means proximate the vessel and adapted to heat the vessel to assist the solar furnace. In some preferred embodiments of the present invention solar desalination system, the auxiliary heating means for the vessel is adapted to operate when solar power is insufficient to evaporate seawater in the vessel. In some preferred embodiments of the present invention solar desalination system, the auxiliary heating means this is an electric heating means that is powered from at least one of the generators.

In some preferred embodiments of the present invention solar desalination system, the riser pipe includes at least one booster heater. In some preferred embodiments of the present invention solar desalination system, the at least one booster heater is selected from the group consisting of a solar heater, a heat exchange heater, an electric heater and combinations thereof.

In some preferred embodiments of the present invention solar desalination system, the egress means includes heat exchange cooling means.

In some preferred embodiments of the present invention solar desalination system, the system further includes an elevated storage tank connected to and downstream from the steam turbine generator and connected to the drop pipe, adapted for storage and controlled release of desalinated water to provide water and power when the solar furnace unit is not producing water and electricity.

In yet others preferred embodiments of the present invention solar desalination system, the system includes: a) a solar furnace unit, including a vessel for receiving and evaporating seawater to create desalinated steam, and a solar energy concentrator positioned adjacent the vessel to concentrate solar energy to the vessel; b) input means for feeding seawater to the vessel; c) brine output means for removal of brine water bottoms from the vessel; d) a riser pipe having a top and a bottom and being connected at its bottom and to extending upwardly from the vessel for transporting steam from the vessel the riser pipe top positioned at a predetermined vertical height from the vessel; e) an electric power-producing steam turbine generator positioned at a predetermined vertical height from the vessel, and connected to the top of the riser pipe for production of electric power with steam from the container; f) a drop pipe having a top and a bottom, and being connected at its tops to the steam turbine generator for removal of desalinated water from the steam turbine generator; g) an electric power-producing hydroturbine generator connected to the bottom of the drop pipe for production of electric power with desalinated water from the steam turbine generator; and, h) egress means for removal of desalinated water from the hydroturbine generator for subsequent use.

In some preferred embodiments of the present invention solar desalination system as set forth in the paragraph immediately above, the riser pipe top and the steam turbine generator are at least 30 meters higher than the vessel.

In some preferred embodiments of the present invention solar desalination system, the solar energy concentrator is selected from the group consisting of a linear parabolic solar concentrator, a parabloid solar concentrator and plural mirror solar concentrator.

In some preferred embodiments of the present invention solar desalination system, the solar energy concentrator is moveably mounted, and includes solar tracking means adapted to move the solar energy concentrator to follow the sun.

In some preferred embodiments of the present invention solar desalination system, the system further includes: i) auxiliary heating means proximate the vessel and adapted to heat the vessel to assist the solar furnace. In some preferred embodiments of the present invention this auxiliary heating means is adapted to operate when solar power is insufficient to evaporate seawater in the vessel. In some preferred embodiments of the present this auxiliary heating means is an electric heating means that is powered from at least one of the generators.

In some preferred embodiments of the present invention solar desalination system, the riser pipe includes at least one booster heater.

In some preferred embodiments of the present invention solar desalination system, the at least one booster heater is selected from the group consisting of a solar heater, a heat exchange heater, an electric heater and combinations thereof.

In some preferred embodiments of the present invention solar desalination system, the egress means includes heat exchange cooling means.

In some preferred embodiments of the present invention solar desalination system, the system includes an elevated storage tank connected to and downstream from the steam turbine generator and connected to the drop pipe, adapted for storage and controlled release of desalinated water to provide water and power when the solar furnace unit is not producing water and electricity.

DETAILED DESCRIPTION OF THE EMBODIMENTS

Figure 1:
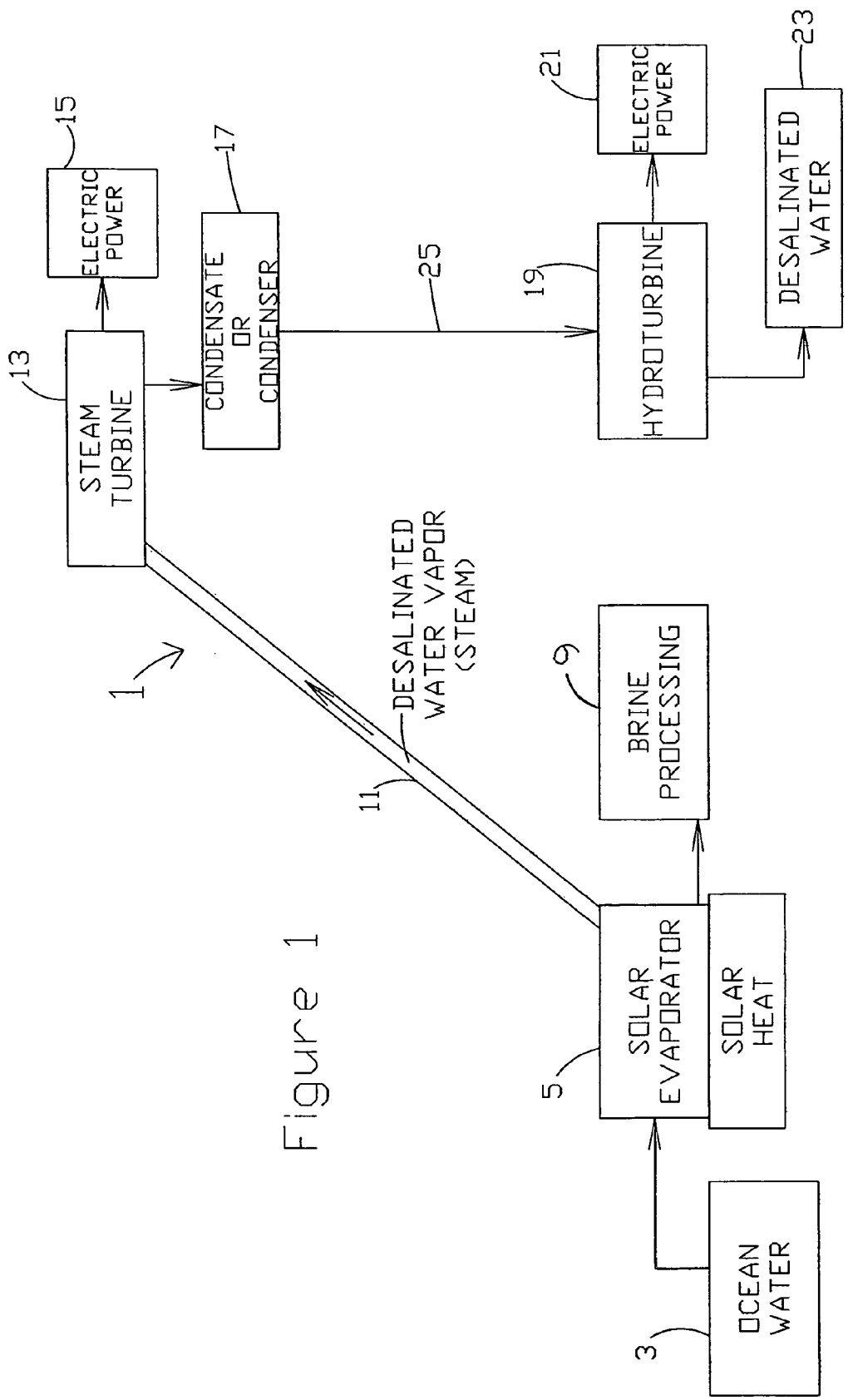
FIG. 1 is a block diagrammatic representation of some preferred embodiments of the present invention solar desalination system.

FIG. 1 is a block diagram of some preferred embodiments of a present invention solar desalination system 1. Present invention system 1 includes a supply of salt water, here ocean water 3, that is fed to or pumped (not shown) to solar evaporator 5. Solar evaporator 5 may be any solar evaporator that has been heretofore suggested or taught and thus many be a flat mirror array for reflecting vast areas of sunlight so as to be directed to a container or vessel for evaporating water out of the saline water. Alternatively, it could be a parabolic dish solar concentrator device or any other solar evaporator or furnace. The size of the solar evaporator 5 is dependent upon the ambient temperature and the volume of ocean water (capacity of the vessel) being used. Thus, solar heat 7 provides the evaporator 5 with heat energy to generate desalinated water vapor (steam that moves up riser pipe 11 a predetermined height, e.g., 200 feet), to steam turbine 13. Steam turbine 13 will be installed on a tower, building or other structure or on a natural elevated area such as a hill or cliff. Steam turbine 13 is an electric power 15 generating steam turbine and may be designed to condense the steam to water or to utilize steam and exhaust the steam.

In either case the steam turbine 13 generates electric power 15 and its $H_2O$ effluent exits as condensate or is condensed 17 at or near the predetermined elevated steam turbine 13. Next, the water product that is dropped a predetermined height, and this height establishes a head of water that drives a water turbine. Thus, the desalinated water travels down drop pipe 25 to drive hydroturbine 19 to generate additional electric power 21. The desalinated water 23 may be treated or otherwise used as desired.

The present invention system could operate on a continuous basis much like tankless water heaters, when there is sufficient sunlight, and appropriate flow valves and controls would be necessary to assure a steady output ratio—for example, 90% tops (desalinated evaporant)/10% bottoms (brine—high density salt water). However, in many cases, the system will operate as a batch process. Details of some embodiments of continuous and batch process of the present invention are discussed below in conjunction with FIGS. 7 and 8.

Figure 2:
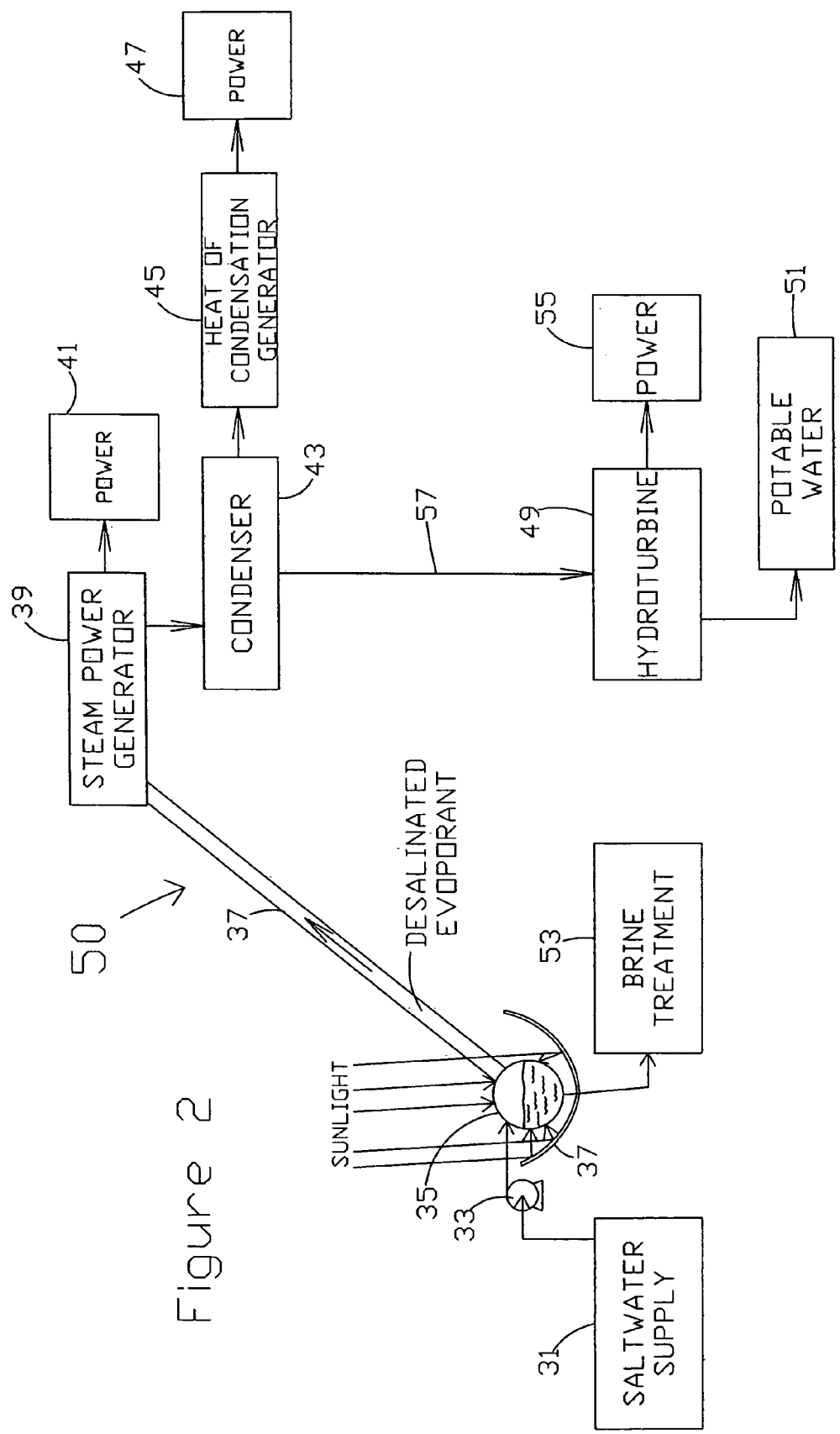
FIG. 2 shows details of one preferred embodiment of the present invention solar desalination system with three different types of electric power generation.

FIG. 2 illustrates a present invention solar desalination system with three different types of electric power generation. System 50 includes a salt water supply 31 and a delivery pump 33 to move the saline water to the solar furnace (evaporator). In this embodiment, the solar furnace is concentrator 37. It is positioned to concentrate solar energy (sunlight) onto vessel 35. Pump 33 is programmed to follow a sequence, such as, when the saltwater level in vessel 35 is below a certain level, a flush mode will initiate. A valve or other liquid egress control (not shown) will open vessel 35 to brine treatment 53, pump 33 may provide flushing salt water from supply 31 and, after a predetermined time or volume of flow, pump 33 will stop and the liquid egress control will close. Next, pump 33 will activate to pump a predetermined volume (or other predetermined parameter) and fill the vessel 35 to a predetermined level. The solar furnace (concentrator 37) will evaporate desalinated water until the vessel 35 is depleted to a predetermined level, and then the flushing and evaporating phases will be repeated.

When the solar concentrator 37 evaporates the desalinated water into steam (desalinated evaporant), this steam travels up riser pipe 37 to elevated steam generator 39 where the steam generates electric power 41. While still at elevation, the steam is condensed to water at condenser 43, and the heat of condensation (e.g., through heat exchangers) is committed to a heat of condensation electric power generator 45 to produce power 47.

Next, the condensed steam (desalinated water) travels down drop pipe 57 (shown as a vertical pipe, but could be a slanted pipe, as down a slope or hill), to hydroturbine 49 to generate electric power 55, and to produce useable water such as potable water 51.

This FIG. 2 present invention solar desalination system 50 creates power at three different sources—steam, heat of condensation and hydro.

Figure 3:
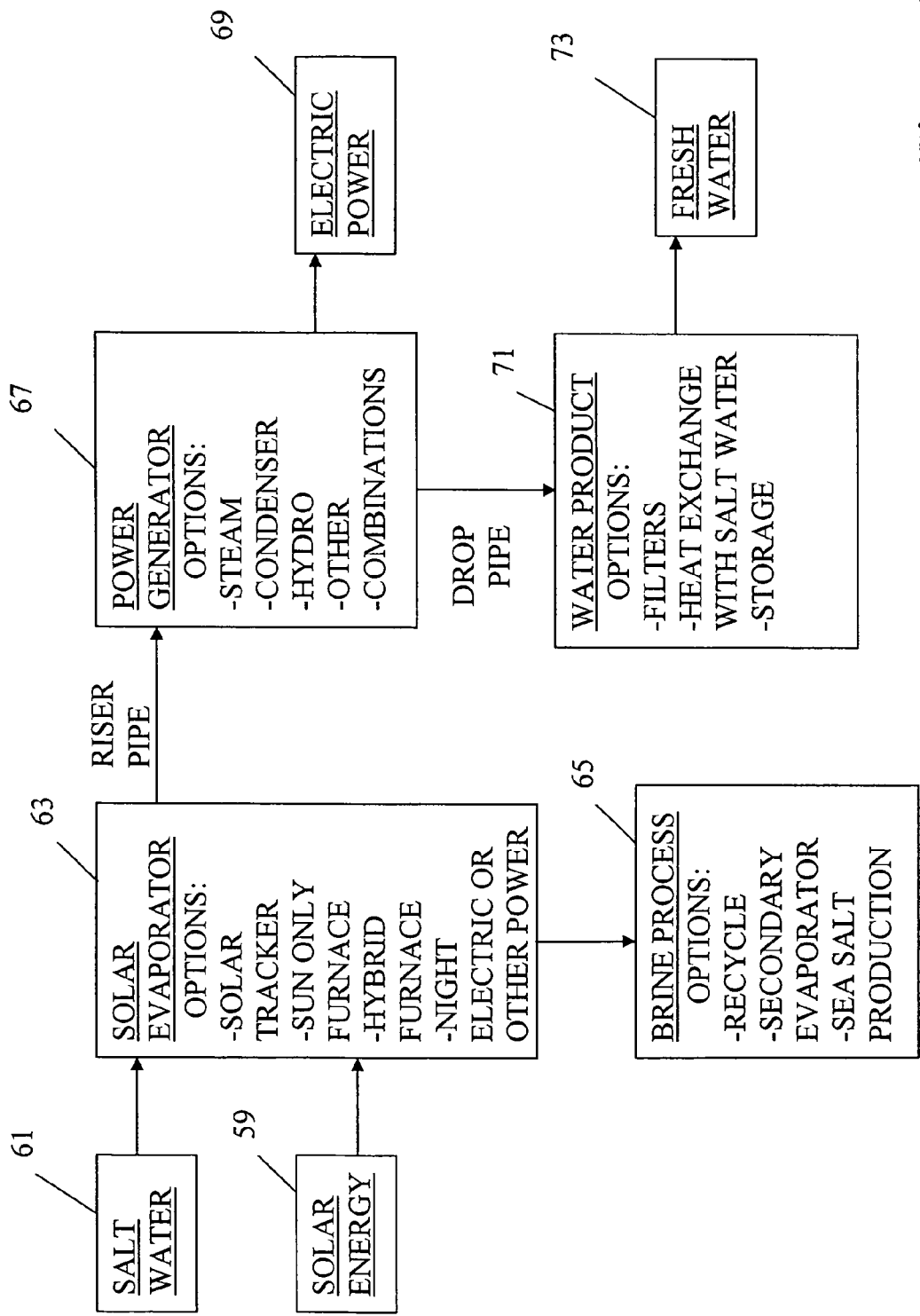
FIG. 3 presents a block diagram showing various preferred embodiment options for present invention power generating solar desalination systems.

FIG. 3 illustrates a block diagram showing various options for some preferred embodiments of the present invention desalinated water-producing, electric power-generating solar desalination systems. The four larger blocks of FIG. 3 represent the four process steps of the present invention system and the four smaller blocks represent inputs and outputs. However, additional outputs are optionally viable, such as salt production and/or saline solution production. In FIG. 3, inputs include solar energy 59 and salt water 61 to solar evaporator 63. Solar evaporator 63 could be a solar furnace or a hybrid furnace. It could also have alternate energy powering for night or other use. Solar evaporator 63 preferably is rotatable and has sufficient tracking capabilities. For example, the vessel may remain stationary while the solar furnace rotates or both may rotate. Alternatively, remotely located reflectors may track the sun and solar furnace may be stationary. The brine treatment process 65 may involve a number of options including recycle, secondary evaporation and sea salt production.

The desalinated evaporant rises to a predetermined height through a column or riser pipe and the elevated water is utilized to generate electric power 69 at power generator 67. Power generator 67 options include steam, condenser, hydro, other and combinations thereof. Water product 71 illustrates various options that result in fresh water 73 and other inherent benefits.

Figure 4:
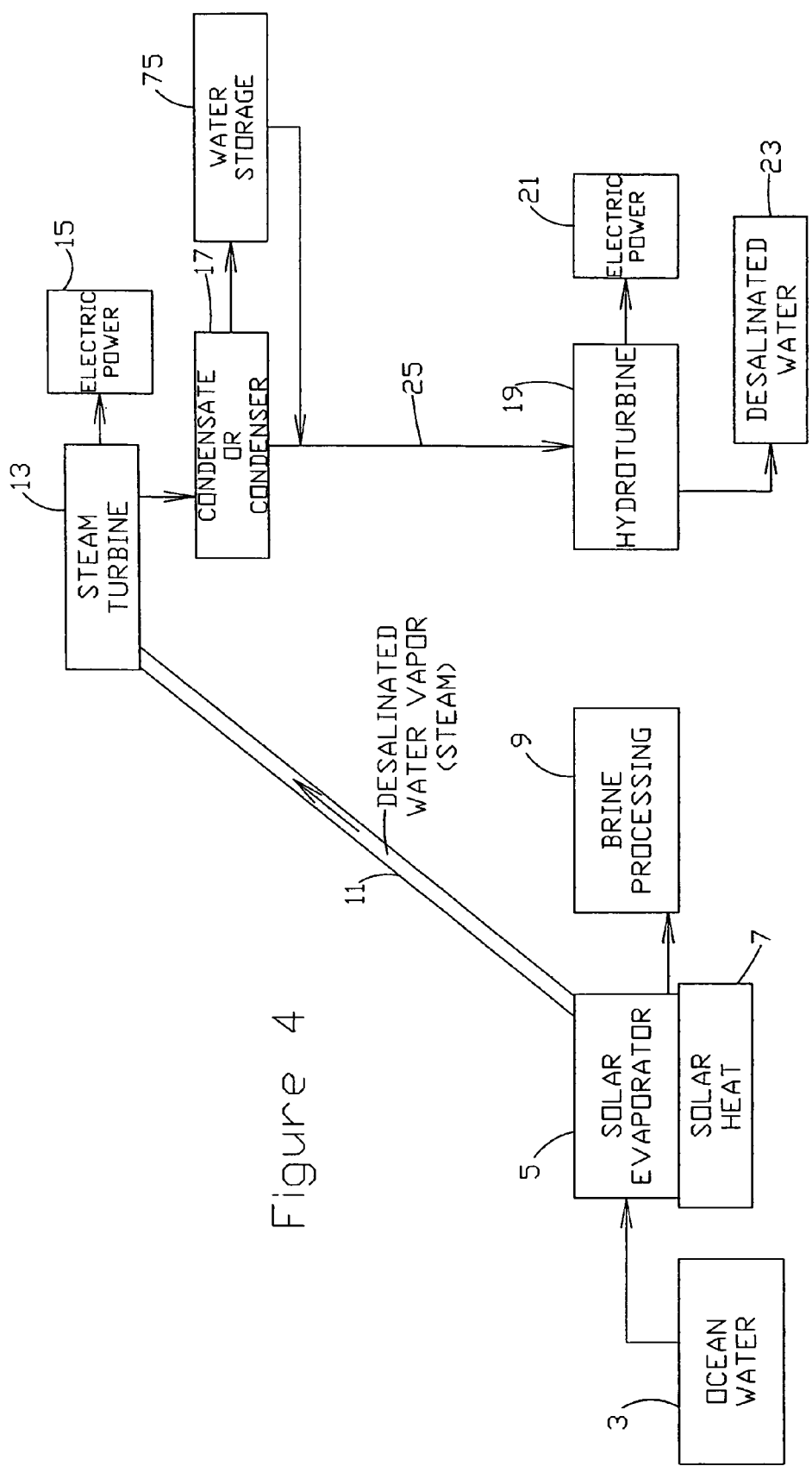
FIG. 4 illustrates FIG. 1 type solar desalination systems but with elevated water storage to provide for water and power availability at night or otherwise when the solar evaporator is not operating.
Figure 5:
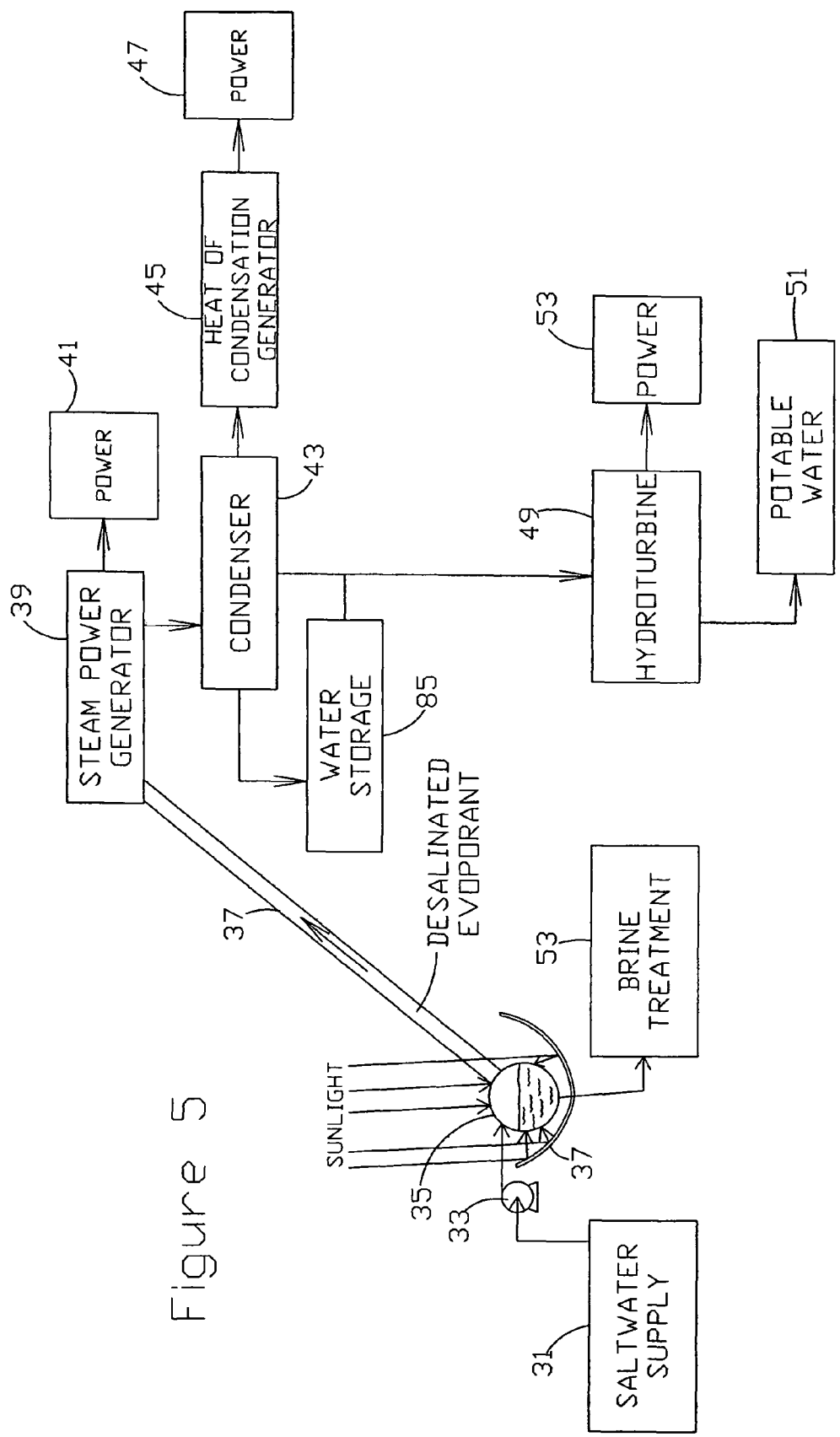
FIG. 5 shows the FIG. 2 preferred present invention solar desalination system, but now including water storage with controlled release.

FIG. 4 is similar to FIG. 1 and identical components are identically numbered. However, in the FIG. 4 embodiments, condensate or condenser 17 water may be fed to drop pipe 25 directly or diverted to elevated water storage 75. By storing water at an elevated level, it may be released at a slow, steady continuous or nearly continuous rate to generate electricity or it may be stored and used on days with low or no sun power. Similarly, FIG. 5 shows the same present invention systems shown in FIG. 2, but includes elevated water storage 85 for the same purposes and benefits described above.

Figure 6:
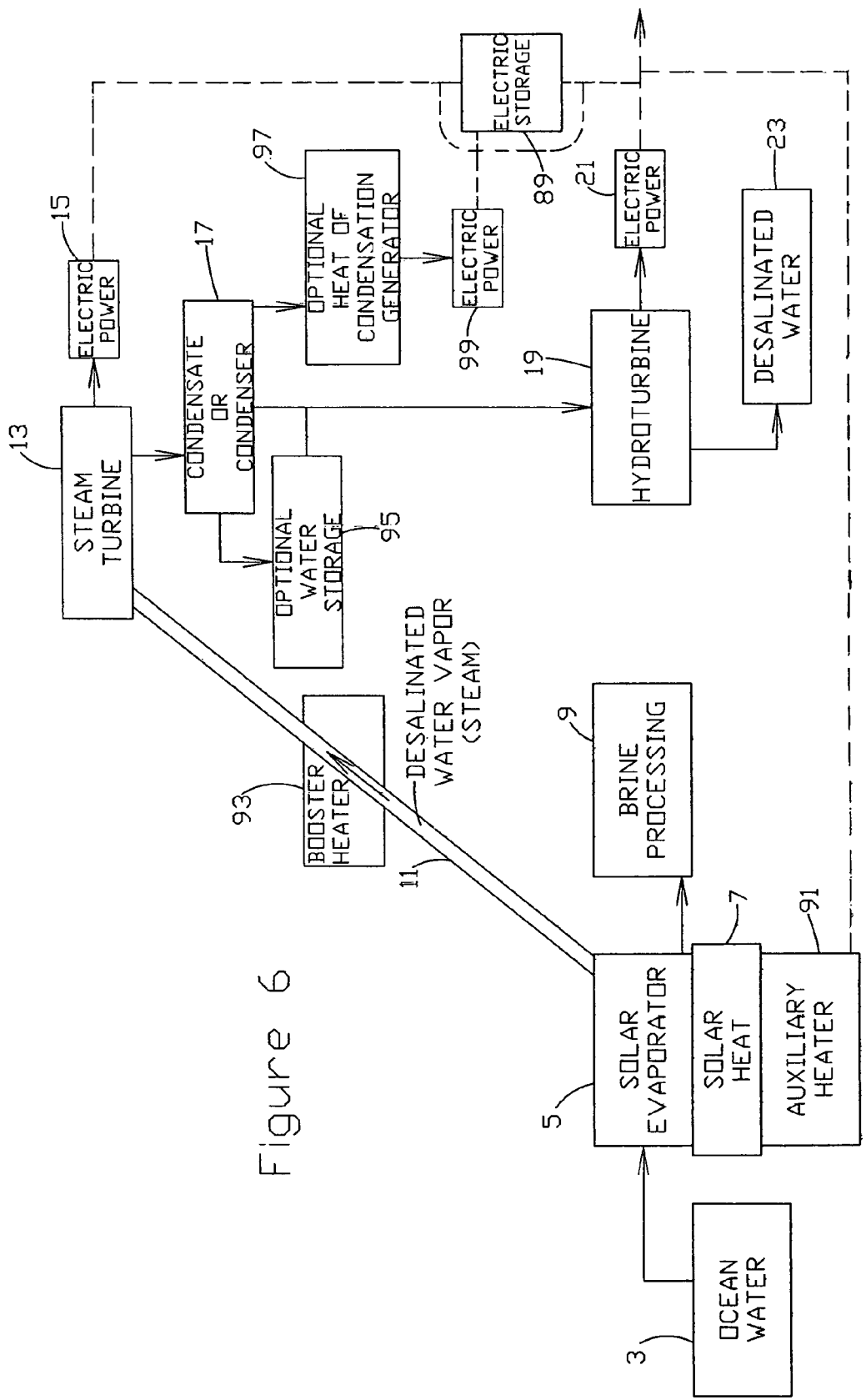
FIG. 6 shows the present invention power generating solar desalination systems of FIG. 1, with steam rise pipe booster heater, optional water storage and optional heat of condensation electric power generation.

FIG. 6 illustrates variations of the FIG. 1 present invention desalinated water-producing, electric power-generating solar desalination systems, illustrating additional options. Otherwise, the elements shown in FIG. 6 that are identical to those in FIG. 1, are identically numbered. These options include a booster heater 93. The booster heater 93 could be any type of heating system, including electrical, but a solar booster would be most efficient. Also included is optional water storage 95 that may be utilized in a manner similar to water storage 75 described in conjunction with FIG. 4 above. Optional heat of condensation generator 97 produces additional electric power 99. Auxiliary heater 91 may be utilized to supplement and/or replace solar heat, depending upon sun availability, and the electric power used for auxiliary heater 91 may advantageously be taken from a grid or from the electric power generated and stored, as from electric storage 89.

Figure 7:
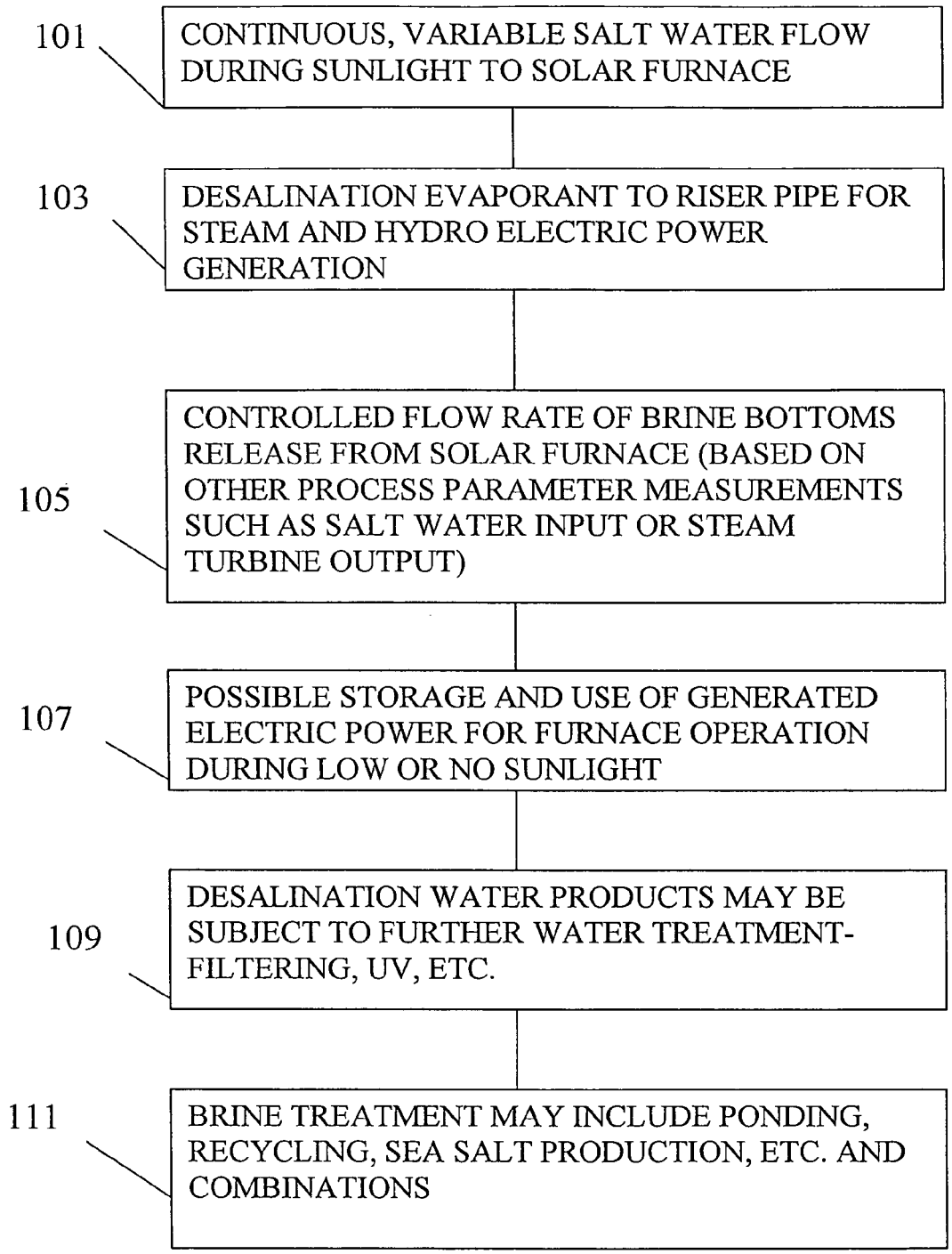
FIG. 7 shows a flow diagram for one embodiment of a continuous operation of a present invention solar desalination system; and, FIG. 8 illustrates a flow diagram for one embodiment of a batch operation of a present invention solar desalination system.

FIG. 7 describes a continuous present invention solar desalination system. Block 101 illustrates that while the system is continuous, the salt water flow to the solar furnace (vessel and concentrator or collector) is variable. The quantity and rate of heat delivered to the vessel from the sun depend upon the time of day, day of year, cloudiness, wind and temperature of the incoming salt water. Thus, while the process can be continuous, the inflow of salt water must be variable to compensate for the aforesaid variables.

For example, present invention computer controlled system has a six ton volume a vessel in the form of a long tube positioned on the focal line of a linear parabolic reflector could have a top inlet for ocean water at one end and a bottom outlet for brine bottoms at the opposite end. The inlet could be fed by a variable rate pumping system (or gravity flow system where the solar furnace is located below the sea water) and the bottoms outlet could have a variable rate valving system a monitor could measure a process parameter such as vessel water level, vessel water weight or steam output and would regulate the inlet flow in accordance with defined process parameter limitations. Likewise, the bottoms outflow could be regulated by the inflow rate such as ten percent of inflow. It is desired to maintain a water level between four and five tons of salt water. The computer control program is designed to maintain the bottoms outlet valve closed during the initial fill stage. The solar furnace will begin to evaporate desalinated water to a riser pipe for steam power generation and hydro electric power generation (block 103). When the vessel water level or weight drops to, for example, five tons, the inlet pumping system will automatically pump salt water to the vessel. The computer system will recognize the inlet flow rate or steam output to open and regulate the flow rate of the brine bottoms (block 105). For example, if the water evaporates and a rate of one ton per hour then the next inlet pumping system will feed replacement salt water at the rate of one ton per hour, then and the brine bottoms outlet will permit 0.1 ton of brine to be released per hour. Such a system would generate 0.9 ton of steam per hour to generate electricity. The desalinated water could be stored at elevation and used to generate electricity though a hydroturbine at night or during low sunlight to electrically power the solar furnace for additional operational time (block 107). The desalination water products may be subject to further water treatment filtering, UV, etc. (block 109). The brine may be treated and brine treatment may include ponding recycling, sea salt production, etc. and combinations (block 111). When effective evaporation has ceased, the computer controlled system recognizes the lack of evaporant removal, and shuts down the system.

Figure 8:
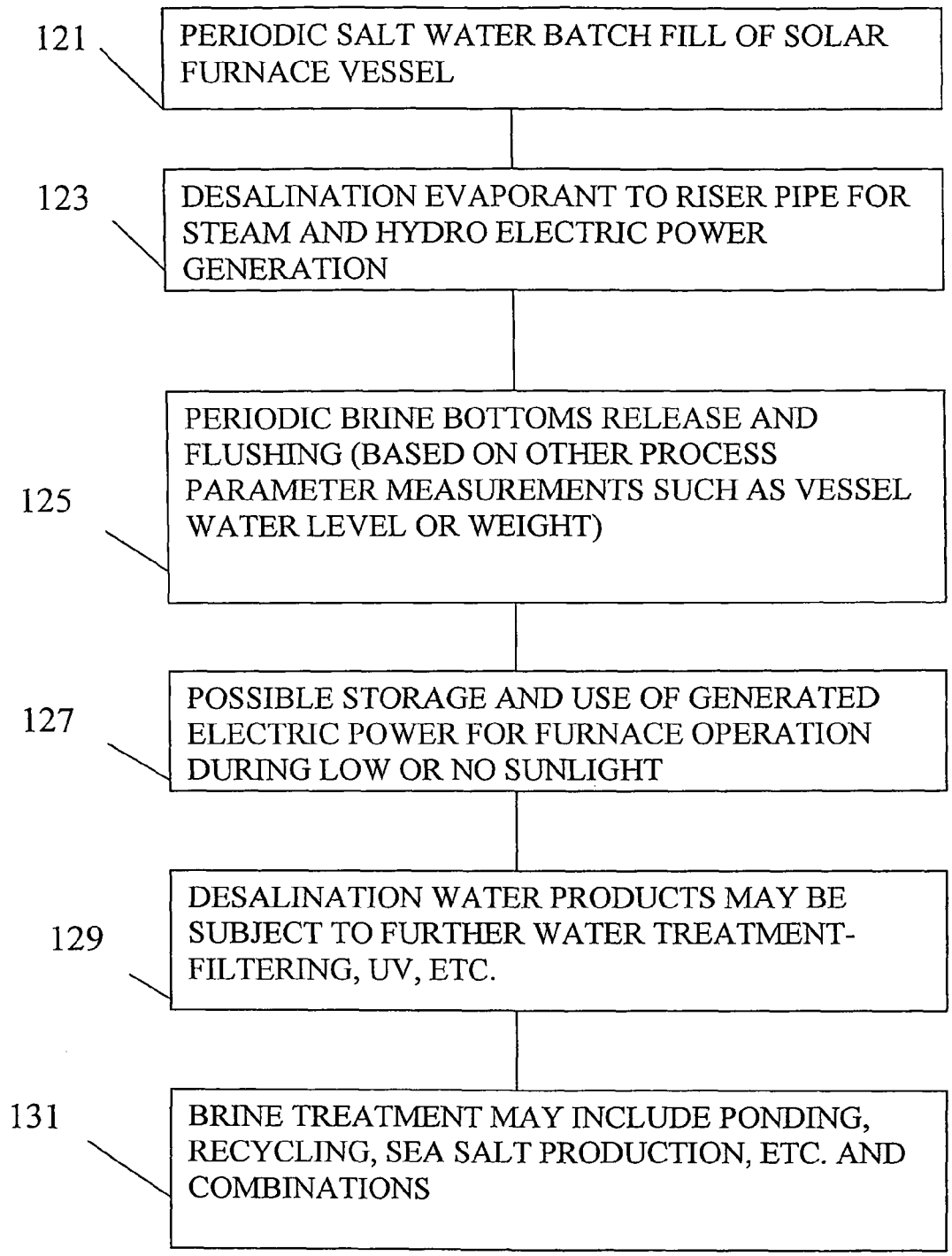

FIG. 8 illustrates the present invention process as a batch process. The salt water is periodically delivered to the solar furnace vessel (block 121) to a predetermined fill level and the feed is shut down. The solar furnace will evaporate the contents of the vessel until a predetermined weight or volume or fill level has been evaporated, and then a computer controlled monitoring system will open a bottoms release valve and initiate flushing with salt water (block 125). After the flushing is completed and the vessel is drained of bottoms, the computer will close the bottoms release valve, and may again initiate a fill step and repeat the process as above.

As with the continuous system, the desalination evaporant (steam) travels up a riser pipe for steam generation and hydro generation of electric power (block 123). The desalinated water may be fed to a hydroelectric generator or completely or partially stored. The stored water could be used to create power for the solar furnace when there is no or low sunlight (block 127). The desalination water products may be subject to further water treatment, such as filtering, UV, etc. (block 129). The brine may be treated and brine treatment may include ponding recycling, sea salt production, etc. and combinations (block 111).

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A solar desalination system for creation of desalinated water from seawater, which comprises:
   a) a solar furnace unit including a vessel for receiving and evaporating seawater to create desalinated steam and a solar energy concentrator positioned adjacent said vessel to concentrate solar energy to said vessel to create said steam and to separate sea salt therefrom in the form of brine water bottoms;
   b) input means for feeding seawater to said vessel;
   c) brine output means for removal of brine water bottoms from said vessel;
   d) a riser pipe having a top and a bottom and being connected at its bottom to, and extending upwardly from, said vessel, to transport steam from said vessel to said riser pipe top, said riser pipe top positioned at a predetermined vertical height from said vessel;
   e) an electric power-producing steam turbine generator positioned at a predetermined vertical height from said vessel, and connected to said top of said riser pipe for production of electric power with steam from said container, whereby a first source of electric power is produced;
   f) a drop pipe having a top and a bottom, and being connected at its top to said steam turbine generator for removal of desalinated water from said steam turbine generator;
   g) an electric power-producing hydroturbine generator connected to said bottom of said drop pipe for production of electric power with desalinated water from said steam turbine generator, whereby a second source of electric power is produced; and,
   h) egress means for removal of desalinated water from said hydroturbine generator for subsequent use;
   wherein said riser pipe top and said steam turbine generator are at least 30 meters higher than said vessel.

2. The solar desalination system for creation of desalinated water from seawater of claim 1 wherein said solar energy concentrator is selected from the group consisting of a linear parabolic solar concentrator, a paraboloid solar concentrator and plural mirror solar concentrator.

3. The solar desalination system for creation of desalinated water from seawater of claim 2 wherein said solar energy concentrator is moveably mounted, and includes solar tracking means adapted to move said solar energy concentrator to follow the sun.

4. The solar desalination system for creation of desalinated water from seawater of claim 1 wherein said system further includes:
   i) auxiliary heating means proximate said vessel and adapted to heat said vessel to assist said solar furnace.

5. The solar desalination system for creation of desalinated water from seawater of claim 4 wherein said auxiliary heating means is adapted to operate when solar power is insufficient to evaporate seawater in said vessel.

6. The solar desalination system for creation of desalinated water from seawater of claim 4 wherein said auxiliary heating means is an electric heating means that is powered from at least one of said generators.

7. The solar desalination system for creation of desalinated water from seawater of claim 1 wherein said riser pipe includes at least one booster heater.

8. The solar desalination system for creation of desalinated water from seawater of claim 7 wherein said at least one booster heater is selected from the group consisting of a solar heater, a heat exchange heater, an electric heater and combinations thereof.

9. The solar desalination system for creation of desalinated water from seawater of claim 1 wherein said egress means includes heat exchange cooling means.

10. The solar desalination system for creation of desalinated water from seawater of claim 1 wherein said system includes an elevated storage tank connected to and downstream from said steam turbine generator and connected to said drop pipe, adapted for storage and controlled release of desalinated water to provide water and power when said solar furnace unit is not producing water and electricity.

11. A solar desalination system for creation of desalinated water from seawater, which comprises:
   a) a solar furnace unit including a vessel for receiving and evaporating seawater to create desalinated steam and a solar energy concentrator positioned adjacent said vessel to concentrate solar energy to said vessel to create said steam and to separate sea salt therefrom in the form of brine water bottoms;
   b) input means for feeding seawater to said vessel;
   c) brine output means for removal of brine water bottoms from said vessel;
   d) a riser pipe having a top and a bottom and being connected at its bottom to, and extending upwardly from, said vessel, to transport steam from said vessel to said riser pipe top, said riser pipe top positioned at a predetermined vertical height from said vessel;
   e) an electric power-producing steam turbine generator positioned at a predetermined vertical height from said vessel, and connected to said top of said riser pipe for production of electric power with steam from said container, whereby a first source of electric power is produced;
   f) a condenser connected to said steam power generator and a heat of condensation electric power generator for production of electric power whereby a second source of electric power is produced;
   g) a drop pipe having a top and a bottom, and being connected at its top to said steam turbine generator for removal of desalinated water from said steam turbine generator;
   h) an electric power-producing hydroturbine generator connected to said bottom of said drop pipe for production of electric power with desalinated water from said steam turbine generator whereby a third source of electric power is produced; and, i) egress means for removal of desalinated water from said hydroturbine generator for subsequent use, wherein said riser pipe top and said steam turbine generator are at least 30 meters higher than said vessel.

12. The solar desalination system for creation of desalinated water from seawater of claim 11 wherein said solar energy concentrator is selected from the group consisting of a linear parabolic solar concentrator, a parabloid solar concentrator and plural mirror solar concentrator.

13. The solar desalination system for creation of desalinated water from seawater of claim 11 wherein said solar energy concentrator is moveably mounted, and includes solar tracking means adapted to move said solar energy concentrator to follow the sun.

14. The solar desalination system for creation of desalinated water from seawater of claim 11 wherein said system further includes: i) auxiliary heating means proximate said vessel and adapted to heat said vessel to assist said solar furnace.

15. The solar desalination system for creation of desalinated water from seawater of claim 13 wherein said auxiliary heating means is adapted to operate when solar power is insufficient to evaporate seawater in said vessel.

16. The solar desalination system for creation of desalinated water from seawater of claim 15 wherein said auxiliary heating means is an electric heating means that is powered from at least one of said generators.

17. The solar desalination system for creation of desalinated water from seawater of claim 11 wherein said riser pipe includes at least one booster heater.

18. The solar desalination system for creation of desalinated water from seawater of claim 17 wherein said at least one booster heater is selected from the group consisting of a solar heater, a heat exchange heater, an electric heater and combinations thereof.

19. The solar desalination system for creation of desalinated water from seawater of claim 11 wherein said egress means includes heat exchange cooling means.

20. The solar desalination system for creation of desalinated water from seawater of claim 11 wherein said system includes an elevated storage tank connected to and downstream from said steam turbine generator and connected to said drop pipe, adapted for storage and controlled release of desalinated water to provide water and power when said solar furnace unit is not producing water and electricity.

* * * * *